Aug. 12, 1958    J. W. LEWIS    2,847,664
GYROSCOPE PICK-OFF DEVICES
Filed Jan. 28, 1954    2 Sheets-Sheet 1
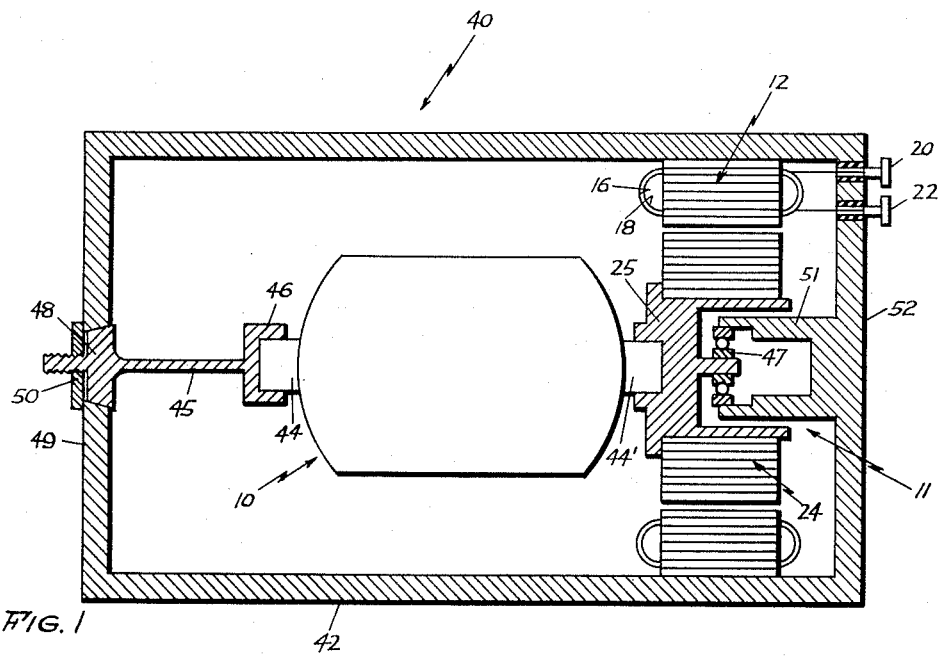
FIG. 1
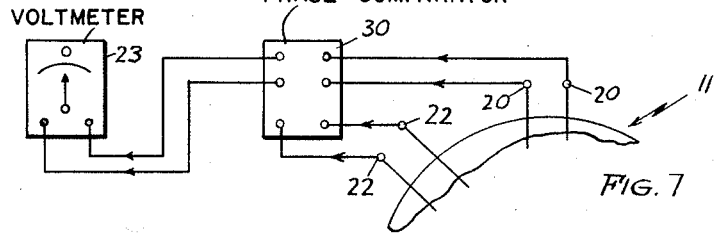
FIG. 7
FIG. 8
INVENTOR
JOHN W. LEWIS
BY
ATTORNEY Aug. 12, 1958  J. W. LEWIS  2,847,664
GYROSCOPE PICK-OFF DEVICES
Filed Jan. 28, 1954  2 Sheets-Sheet 2

INVENTOR
JOHN W. LEWIS
BY
ATTORNEY

United States Patent Office 2,847,664
Patented Aug. 12, 1958

2,847,664
GYROSCOPE PICK-OFF DEVICES

John W. Lewis, North Easton, Mass., assignor to Raytheon Manufacturing Company, Waltham, Mass., a corporation of Delaware Application January 28, 1954, Serial No. 406,858

8 Claims. (Cl. 340—345)

This invention relates to a gyroscope pick-off which permits the measurement of an angle of rotation of a shaft in terms of an output voltage, and more particularly relates to a device for converting the angle of precession of a gyroscope into an alternating current voltage which may be used for indicating or control purposes.

In applications involving servomechanisms and gyroscopes, it is often desirable to obtain a voltage whose magnitude and polarity is indicative of a limited angular displacement from a predetermined position. In accordance with the subject invention, the gyroscope pick-off may comprise a gyroscope assembly and an electromagnetic pick-off device associated therewith.

The pick-off device includes a multipolar rotor secured to a shaft which may be attached to a gimbal ring of the gyroscope and whose angular position with respect to some predetermined position is to be measured. The pick-off device also includes a stator having twice as many pole pieces as the rotor and wound with two separate continuous windings consisting of a series of serially-connected coils or loops. One of these stator windings is an input winding across whose terminals an alternating current input voltage is connected. This winding is wound about a first set of adjacent pairs of pole pieces. Each coil of this winding surrounds one pair of adjacent stator pole pieces in one direction and spans the next pair of adjacent pole pieces in the opposite direction, etc., so that pairs of adjacent pole pieces of like polarity alternate with pairs of adjacent pole pieces of the opposite polarity about the periphery of such stator. The second winding on the stator is a continuous output winding wound in mutual coupling relationship with said input winding about a second set of adjacent pairs of stator pole pieces displaced from said first set by one pole pitch. Since all the coils of the output winding span two adjacent pole pieces which are displaced one pole pitch from the adjacent pairs of pole pieces spanned by the coils of the input winding, each half of a given coil or loop of the output winding surrounds a pole piece of opposite polarity. The flux produced by energization of the input winding thus links the two halves of a given coil of the output winding in opposite directions.

A net voltage is derived across each coil of the output winding depending upon the relative position of the rotor and stator. Because of the symmetry of the pick-off device, this net voltage across the terminals of the output winding is the net voltage across each coil multiplied by the number of such coils in series. When the rotor is in a null position, that is, when the center line of a rotor pole piece is midway between the center lines of corresponding adjacent stator pole pieces of either said first set or said second set, the magnetic field associated with the energized input winding is such as to induce a minimum or zero net voltage in the output winding, since the voltage in each half of the various coils of the output winding substantially cancel. This voltage theoretically should be zero, but in some cases may depart from zero by a small amount owing to slight inaccuracies in geometry of the rotor and stator structures, etc.

As the rotor is turned in either a clockwise or counter-clockwise direction from the null position, for example, as the gyroscope precesses, the air gaps between a given rotor pole piece and the stator pole pieces nearest thereto are no longer substantially identical. The magnetic field associated with the input winding now becomes redistributed and the voltages induced in the halves of each of said coils of the output winding now add to a net output voltage which is a function of the amount of flux linking the halves of each coil, and this net output voltage, in turn, is proportional to the angle through which the rotor has turned from the aforesaid null position. The output voltage derived for clockwise rotation is displaced 180 degrees in electrical phase from that derived for counterclockwise rotation. In this manner, the angular position of the input shaft to which the rotor is connected is reproduced as an output voltage whose magnitude is dependent upon the angular departure of the shaft from the predetermined position, and whose polarity is dependent upon the direction of said departure.

Alternatively, the relative position of the rotor and stator may be reversed, so that the outer member, rather than the inner member, rotates. The principle of operation of this alternative arrangement, however, is identical to that previously described.

A stator input or output winding whose coils each span two adjacent pole pieces offers advantages over a stator winding whose coils or loops are wound about each pole piece individually. One advantage is that the same number of turns on each of the pole pieces of an adjacent pair is assured, whereas a winding spanning only a single pole piece may not have the same number of turns per pole. The flux set up by the adjacent pole pieces of opposite polarity and, hence, the flux linking the halves of each coil of the output winding is, therefore, balanced when the rotor is in the aforesaid null position. Another advantage of having the winding coil span two pole pieces is that a saving in copper may be effected.

If the stator contains less than eight poles, it is virtually impossible, because of the large angular displacement of adjacent stator pole pieces, to wind the stator so that one coil or loop spans two adjacent pole pieces. This difficulty is removed in the subject invention by constructing the stator with four or more pairs of stator pole pieces.

In addition to solving the aforesaid winding problem, certain other advantages ensue by increasing the number of pairs of pole pieces. Since the flux present in the stator yoke is substantially equal to the stator pole flux, the flux per pole may be reduced by increasing the number of pole pieces. Since the flux can follow more paths as the number of poles is increased, the cross-sectional area of the stator yoke may be reduced and a rotor of larger diameter is permissible. An increase in the effective air gap area, that is, the area of overlap of a stator pole piece and a contiguous rotor pole piece, for a given overall outside diameter of pick-off device, is thereby achieved.

Since the space between poles is greatly reduced as the number of poles is increased, the total air gap area is further increased. The angular or system sensitivity, that is, the angular rate of change of output voltage, is a function of the angular rate of change of effective air gap area. Consequently, the greater the number of poles employed, the greater becomes the angular or system sensitivity.

Moreover, the greater the number of poles used, the less sensitive is the pick-off device to radial misalignment and undesirable vibration effects.

The total angle through which the output voltage is linear with rotational angle, unfortunately, is an inverse function of the number of poles. However, by using flared pole pieces having a comparatively large pole arc, the total angle through which the output voltage is linear with rotational angle, resulting from an increase in number of poles, is largely offset.

The stator output voltage which corresponds to the angular displacement of the rotor shaft, that is, to the precession of the gyroscope and the stator input voltage, may be applied to a phase comparator whose output is connected to an indicating zero-center voltmeter calibrated to indicate the amount and direction of the aforesaid angular displacement or precession. The stator output voltage and stator input voltage may, on the other hand, be applied to a phase comparator whose output is connected to an automatic control means, such as an autopilot. The function of this automatic control means is to compensate for the cause of the departure in angular displacement of the rotor from a null position and return the rotor to its null position. If a rate gyroscope is connected to the rotor shaft, the precession of the gyroscope caused by some deviation from a desired position of a device in which the gyroscope is installed may be returned to zero by means of this automatic control means.

Other and further objects and advantages of this invention will be apparent as the description thereof progresses, reference being had to the accompanying drawings wherein:

Fig. 1 is a diagrammatic view of a gyroscope pick-off including a rate gyroscope and electromagnetic pick-off device;

Fig. 7 is a view of an output utilization means connected to the stator terminals of the devices of Figs. 2–6;

Fig. 8 is a block diagram of an alternative utilization means connected to the stator output terminals of a device similar to that shown in Figs. 2 to 6;

Like reference numerals will be used in the various figures of the drawings to designate corresponding elements.

Figure 2:
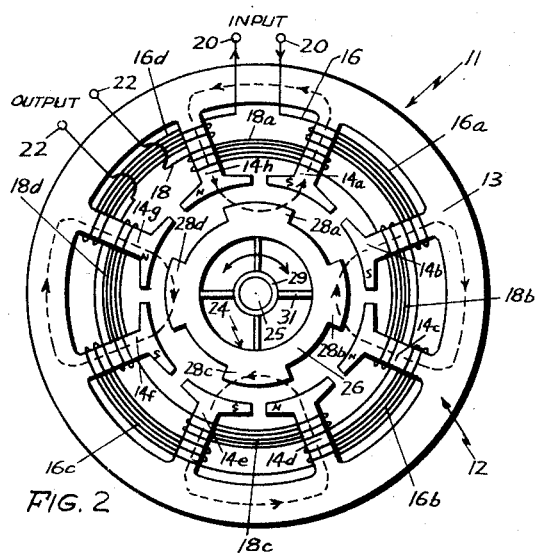
Fig. 2 is a view in elevation of an electromagnetic pick-off device in which the rotor is in one of two possible null positions.

Referring to Fig. 1, the rate gyroscope pick-off system 40 includes a gyroscope assembly 10 and an electromagnetic pick-off device 11, which may be mounted within an appropriate housing or case 42. The rate gyroscope assembly is described in somewhat greater detail in an application for United States Letters Patent of Stanley Kahn et al., Serial No. 406,790, filed January 28, 1954, now U. S. Patent No. 2,714,311. The operation of the rate gyroscope is well known and is based upon the inertia of a spinning mass forming part of gyroscope assembly 10 and supported from a gimbal ring, the ends 44 and 44' of which are attached, respectively, to an enlarged cup-shaped end portion of a torsion bar 45 and a rotary shaft 25. The other enlarged end 48 of the torsion bar 45 is attached to the end wall 49 of housing 42 by means of a nut 50. Rotary shaft 25 rotates on ball bearings 47 carried by an extension 51 of end wall 52 of housing 42. As the gyroscope housing rotates about an axis perpendicular to the axis of rotation of the spinning member, sometimes referred to as a gyro wheel, the gimbal ring on which the gyro wheel is mounted rotates or precesses about an axis mutually perpendicular to the aforesaid axis of rotation. The torsion bar is an elongated springy member which restrains movement of the spinning mass about the axis of precession. The amount of precession is determined by the rate at which the gyroscope housing is moved. This precession of the gyroscope causes rotation of shaft 25 of the electromagnetic pick-off device, which further includes a rotor assembly 24 attached to said shaft and a wound stator assembly 12 carrying an input winding 16 and an output winding 18 whose ends are connected to respective input and output pairs of terminals 20 and 22. The details of the electromagnetic pick-off device 11 will now be described.

Referring to Fig. 2, the electromagnetic pick-off device 11 includes a stator assembly 12 made of a magnetic material, such as soft iron. This stator assembly consists of a substantially circular yoke portion 13 which forms a part of the magnetic circuit and acts as a mechanical support for the device, as well as a plurality of equally spaced radially disposed salient pole pieces or cores 14a, 14b, 14c, etc. These pole pieces may be integral with the yoke or may be made separately and fastened to said yoke, as by bolts or dove-tailing. The faces of the stator pole pieces 14 are preferably flared so as to increase the ratio of pole arc to pole pitch, for reasons already mentioned. The ratio of stator pole arc to pole pitch must be less than unity in practice, not only to allow space for insertion of the stator windings but also to minimize the permeability of the flux path between adjacent pole pieces so that adequate flux may enter the rotor. The enlarged portions or faces of the pole pieces may be a part of the body of the pole pieces or may be separate members bolted or dove-tailed thereto.

The stator further includes an input winding 16 and an output winding 18 wound about the various pole pieces 14 in the following manner. Input winding 16 is continuous and consists of a plurality of serially-connected coils or loops 16a, 16b, 16c, and 16d, each of which surrounds a pair of adjacent pole pieces, as clearly shown in Fig. 2. For example, a coil 16a is wound clockwise as seen looking radially outward about pole pieces 14a and 14b. This coil is in series with coil 16b which is wound about the next pair of pole pieces 14c and 14d in a counterclockwise direction, that is, in a direction opposite to that of the coil 16a. Winding 16 next includes a coil 16c which surrounds pole pieces 14e and 14f in a direction opposite that of the immediately preceding coil 16b, while a coil 16d surrounding pole pieces 14g and 14h completes the input winding. The ends of this input winding 16 are connected to input terminals 20 across which is connected a reference source of alternating current input voltage. For purposes of explanation, the instantaneous direction of current flow in input winding 16 is indicated by the arrows adjacent the input terminals. The instantaneous magnitude and direction of this current will, of course, vary according to the characteristic of the alternating current input voltage. The instantaneous polarity of pole pieces 14a to 14h, corresponding to the instantaneous current flow assumed, will be as shown by the letters N and S, and is determined by the well-known "right-hand rule."

The output winding 18, like the input winding, is continuous and consists of a series of coils or loops 18a, 18b, 18c, and 18d, each of which encircles a pair of adjacent pole pieces. The coils of winding 18, however, are wrapped about differently paired pole pieces than the coils of input winding 16. For example, coil 18a is wound about pole pieces 14h and 14a in one direction, coil 18b is wound about pole pieces 14b and 14c in the opposite direction, coil 18c surrounds pole pieces 14d and 14e in the same direction as coil 18a and, finally, coil 18d surrounds pole pieces 14f and 14g in the same direction as coil 18b. The ends of output winding 18 are connected to output terminals 22 across which an output voltage, to be referred to subsequently, is derived. Although the input winding is shown as wound about the outer end of the stator pole pieces, and the output winding wound adjacent the pole faces, the relative position of these two windings may be reversed without affecting the operation.

Figure 4:
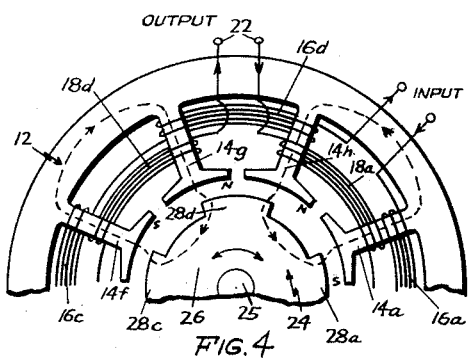
Fig. 4 is a view of the device of Fig. 2 showing the rotor in a second possible null position.

The rotor 24 of pickup device 11 is keyed or otherwise securely attached to shaft 25 which may be connected to the gyroscope of Fig. 1 or to any other device whose angular motion is to be observed. The rotor may be solid, as shown in Fig. 4, or may be of lightened construction such as shown in Fig. 2 so as to have less inertia. The rotor 24 of Fig. 2 has a yoke portion 26 from which a plurality of equally spaced pole pieces 28 project radially. The number of such pole pieces is one-half the number of stator pole pieces. The yoke 26 is connected to a shaft-engaging hub 29 by an appropriate number of spokes 31 which depends upon the mechanical strength required. Since the rotor ordinarily is turned through only a limited angle, and does not rotate continuously at high angular velocities, the mechanical requirements of the rotor are much less stringent than those for a standard generator or motor. Rotor 24 is constructed of magnetic material, such as soft iron, and, unlike the stator, is free of any windings.

The air gap between the pole faces of the rotor and stator is substantially uniform and is partly dependent upon the ampere turns available in the stator. Since the permeability of air is several hundred times greater than that of iron or ferromagnetic alloys, almost all the reluctance of the magnetic circuit of the pick-off device 11 occurs at the air gaps between the rotor and stator. Furthermore, since the length of the air gap between the stator and rotor pole pieces is much less than the length of the air gap between the stator and the rotor yoke, the reluctance of the air gaps between overlapping rotor and stator pole pieces is relatively small compared with the reluctance of the air gaps between the stator and the rotor yoke. Consequently, when a rotor pole piece is in alignment with a contiguous stator pole piece, as, for example, pole pieces 14a and 28a of Fig. 3, the area of the effective air gap therebetween is a maximum and the permeability of the portion of the magnetic circuit, including said aligned pole pieces, is a maximum. On the other hand, when no part of a rotor pole piece overlaps a stator pole piece, the permeability of the magnetic circuit is a minimum. This condition is illustrated in Fig. 3 by pole pieces 14h and either of pole pieces 28a or 28d.

One possible null position of rotor 24 is shown in Fig. 2. The center line of each rotor pole piece 28 is midway between the center lines of a corresponding pair of adjacent stator pole pieces carrying a coil of output winding 18. It will be seen that each rotor pole piece then lies midway between a north pole and a south pole on the stator. The lines of force produced by the magnetomotive force associated with energized input winding 16 must emanate from a stator north pole and enter a stator south pole. These lines of force, indicated by the dashed lines in Fig. 2, will be concentrated along the path of least reluctance, this path includes the portion of said iron rotor closest to said stator poles, namely, a rotor pole piece. Furthermore, the effective air gap areas corresponding to each of a pair of stationary pole pieces, such as pole pieces 14h and 14a, are equal. The flux linking the left-hand half of coil 18a is clearly equal and opposite to that linking the right-hand half of said coil. Since the two halves of each coil are effectively in series opposition, the net voltage induced in output coil 18a, owing to the flux linking the halves of said coil, is substantially zero. Likewise, the flux linking the two halves of coil 18b is oppositely directed in the halves of said coil and is of substantially equal magnitude in each half, so that the net voltage induced in output coil 18b is substantially zero. The same is true of the net voltage in coils 18c and 18d. In other words, because of the symmetry of the structure of Fig. 2, the same flux appears in all the stator pole pieces. Since there is a balance of flux linking the halves of each of the coils of output winding 18, and since all these coils are in series opposition, the net output voltage derived at output terminals 22 is substantially zero. In Fig. 7 an indicating circuit is shown including a conventional phase comparator circuit 30 and a zero-center voltmeter 23. The phase comparator has one set of input terminals connected to the stator input terminals 20 and the other set of input terminals connected to the stator output terminals 22. The voltmeter 23 is connected across the output terminals of phase comparator 30. The indicating circuit of Fig. 7 similarly may be connected to terminals 20 and 22 of the devices of Figs. 3 to 6. Since there is a definite relationship between the output voltage and angular displacement of shaft 25 from the null position, voltmeter 23 may be calibrated in terms of degrees departure from null position. Furthermore, since the above relationship is substantially linear, the voltmeter calibration will be substantially linear, thereby providing for accuracy and ease of reading.

Figure 3:
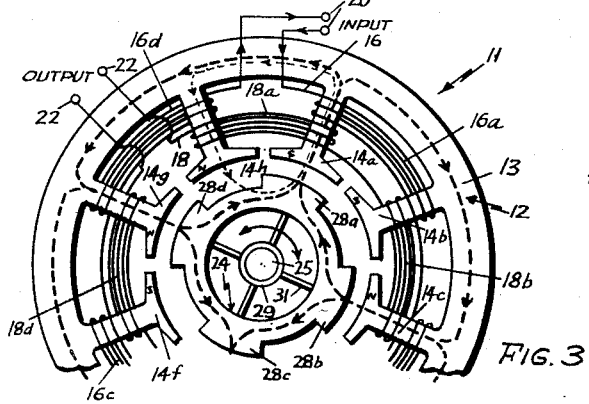
Fig. 3 is a view in elevation of the device of Fig. 2 wherein the rotor has been displaced from the null position of Fig. 2.

In Fig. 3 the effect of rotation of the rotor in a clockwise direction from the null position of Fig. 2 is shown. The same current direction is assumed as in Fig. 2. The area of the effective air gap between rotor pole piece 28a and stator pole piece 14h decreases to a minimum while that between rotor pole piece 28a and stator pole piece 14a increases to a maximum. Likewise, the effective area of the air gap between the various other rotor and stator pole pieces changes. The major portion of the flux will no longer traverse the path shown in Fig. 2, but will be concentrated along the paths shown in the heavy dashed lines of Fig. 3. For example, the majority of the flux will be concentrated along a path from stator pole piece 14g across the air gap of increased effective area between stator pole piece 14g and rotor pole pieces 28d, through the low reluctance yoke of the rotor, thence out of rotor pole piece 28a across the air gap of increased effective area between rotor pole piece 28a and stator pole piece 14a and through the stator yoke 13 to the beginning. Because of the decreased effective area of the air gap between the north pole 14h of the stator and the rotor pole piece 28a, very few lines of force will traverse this air gap and follow the path shown in Fig. 3 by light dashed lines. In other words, the flux traversing the stator pole piece 14h, about which the left-hand half of the coil 14a is wound, is much less than that threading stator pole piece 14a about which the right-hand half of this same output coil 18a is wound. Because of this unbalance of flux, the voltages induced in the two halves of coil 18a are unequal and a net voltage appears across this coil. Similarly, the flux is concentrated in certain other paths shown by dashed lines in Fig. 3. It may be seen that the net voltages induced in the halves of the other coils of output winding 18 are unequal and that a net output voltage is produced across the terminals of each output coil. The voltages thus produced add up in such a manner that the total output voltage is developed across output terminals 22 which is substantially a maximum.

The output voltage thus varies from a minimum when the rotor is in the position shown in Fig. 2 to a maximum for the rotor position shown in Fig. 3. This output voltage, partly because of the large pole arc of the stator pole pieces, may be made to vary substantially linearly with angular position of the rotor between the limits shown in Figs. 2 and 3.

As previously mentioned, there are two possible null positions of rotor 24. The second of these positions is shown in Fig. 4. Here the center line of the rotor pole pieces 28 bisects the angle formed by the center lines of a corresponding pair of adjacent pole pieces spanned by a coil of the input winding 16, instead of a coil of output winding 18 as in the case of Fig. 2. The instantaneous assumed direction of the current flow in the stator input winding 16 of Fig. 4 and the manner of winding the stator are the same as shown in Fig. 2. The path of greatest flux concentration is now longer than that for the first null position shown in Fig. 2 because of the difference in relative placement of north and south poles of the stator with respect to the rotor pole pieces. For example, the lines of force emanating from the north pole 14h and entering the south pole 14a must travel through the portion of the rotor yoke 26 lying between rotor pole pieces 28d and 28a. The same increased path length exists for the lines of force associated with the other pairs of adjacent pole pieces owing to the symmetry of the device. Because of this increased path length, the reluctance of the magnetic circuit is increased, and the voltage induced in the halves of the various coils of the output winding, for a given departure of the rotor from null position, is smaller than that derived in the device of Fig. 2. Because of the greater voltage sensitivity obtained, the null position shown in Fig. 2 is preferable to that shown in Fig. 4. The voltage sensitivity, which represents the output voltage obtainable for a given value of input voltage, should be clearly distinguished from the angular or system sensitivity which is the sensitivity of significance in this invention.

Although the pick-off device 11 may be used to indicate the angular displacement of a shaft from some predetermined null position, as, for example, the precession of a rate gyroscope, the device may also be used to supply a control voltage at terminals 22 for actuating an automatic control means 23', such as an auto-pilot, as shown in Fig. 8. This automatic control means 23', which replaces the voltmeter 23 of Fig. 7, may consist of any of several well-known electrical or electromechanical follow-up systems which, in response to the control voltage across terminals 22, causes the rotor to return to its null position.

Figure 5:
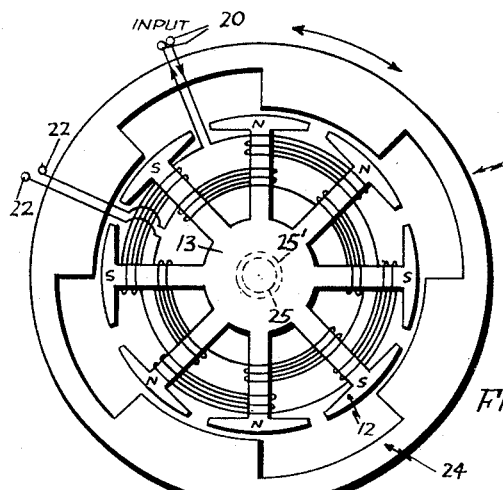
Fig. 5 is a view in elevation of a modification of the device of Fig. 2 in which the relative position of the stator and rotor is reversed.

The relative position of the rotor and stator may be reversed from that shown in Fig. 2. This reversed arrangement is shown in Fig. 5. The rotor 24 is now the outer member which may rotate a limited amount in either direction about the centrally disposed stationary member 12. The stator of Fig. 5 is wound in the same manner as that of Fig. 2, while the rotor, like that of Fig. 2, has half as many pole pieces as the stator. The rotor is mounted on an input shaft 25. Although not shown in the drawing, the rotor may have an integral bell-shaped portion terminating in a reduced portion which engages the shaft 25. The stator 12 may be mounted about a separate shaft 25' collinear with rotor shaft 25 and shown on the drawing as of larger diameter than that of rotor shaft 25, although these shafts need not be of the same size. The method of mounting the stator shaft is illustrative only and other means of fixedly supporting a stator concentrically with respect to the rotor are within the scope of this invention.

Figure 6:
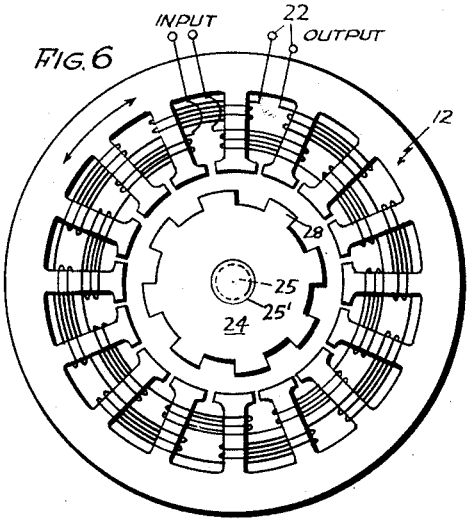
Fig. 6 represents an electromagnetic pickup device differing from that of Fig. 2 in having twice as many pole pieces on both rotor and stator.

The device shown in Fig. 6 is a modification of a device of Fig. 1 having sixteen salient poles on the wound member instead of eight poles and having eight poles on the other member. The advantages of increasing the number of pairs of poles on the stator and rotor already have been enumerated. As previously mentioned, the angular or system sensitivity, that is, the angular rate of change of output voltage of the 16-pole device of Fig. 6, is a function of the angular rate of change of effective air gap area. The greater the number of poles on the pick-off device 11, the larger is the angular rate of change of effective air gap area so that the angular sensitivity of the 16-pole device of Fig. 6 is greater than that of the 8-pole device of Fig. 2.

Figures 9, 10:
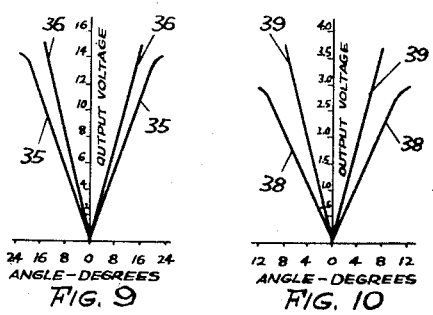
Figs. 9 and 10 show the relation between output voltage and angular rotor displacement from null position, for various input excitation voltages, for the devices of Figs. 2 and 6, respectively.

It will be noted in Fig. 6 that the member carrying the input and output windings is adapted to rotate instead of the unwound member. The pickup devices of Figs. 2 to 5 are characterized in that the so-called stator member 12 carrying the input and output windings is stationary while the member 24 is the rotating member. The member 12 of Fig. 6, previously referred to as the stator, is actually the rotating member while member 12 of Fig. 6, previously referred to as the rotor, is fixed in position. Since all the devices operate on the basis of redistribution of flux resulting from relative displacement of the rotating and stationary members, it is immaterial which member actually rotates. As shown in Fig. 6, the rotating member 12 is mounted on shaft 25 while the stationary member 24 is affixed to spindle 25' which may, for example, be affixed to the housing 42 of the gyro pick-off shown in Fig. 1. It should be understood from the above remarks that either one of members 12 and 24 of Figs. 2 to 6 may rotate while the other member remains stationary. An idea of the relative sensitivity of the devices of Figs. 2 and 6 is shown by the curves of Figs. 9 and 10, respectively. Curve 35 of Fig. 9 indicates the relationship between the angular displacement of the input shaft from null position and the output voltage obtained across output terminals 22, for a particular value of input voltage; curve 36 illustrates the above relationship for a higher value of input voltage. Since the abscissa of curves 35 and 36 is calibrated in angular departure in degrees from null position, the latter is indicated by zero and the portions of the curve to the left and right of zero correspond, respectively, to a counterclockwise and clockwise rotation from the null position. The curves are symmetrical about the Y-axis, indicating that the voltage obtained for a given angular displacement of the rotor from its null position is substantially independent of the direction of said displacement. As the input voltage applied to terminals 20 increases, the curves become steeper and the angular or system sensitivity of the pick-off device is improved.

Curves 38 and 39 of Fig. 10 correspond to two values of stator input voltage and show the improvement in sensitivity resulting from the use of a larger number of pole pieces. As in the previous case, an increase in input voltage effects an improvement in operation of the pick-off device. By increasing the number of poles as shown in the device of Fig. 6, the flux per pole is reduced and the voltage sensitivity, not to be confused with the angular or system sensitivity just referred to, decreases. This sacrifice of voltage sensitivity, clearly shown by comparison of Figs. 9 and 10, is more than compensated for by the greater improved system sensitivity and is of no great concern inasmuch as sensitive indicating devices capable of indicating a range of output voltages such as shown in Fig. 10 are readily available.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In combination, an electromagnetic device including a stationary member and a rotating member, said members each having a plurality of pole pieces, a continuous input winding wound about a first set of pairs of adjacent pole pieces of one of said members, said input winding being supplied with alternating current energy for producing magnetic flux in the pole pieces of said one member which is in the same direction in both pole pieces of each pair of said first set but in opposite directions in the pole pieces of successive adjacent pairs, a continuous output winding wound about a second set of pairs of said pole pieces of said one member which are displaced from said first set, said output winding being linked by said magnetic flux, said rotating member having a null position in which the voltage induced in each coil of said output winding is substantially zero, and means responsive to the angular displacement of said rotating member in either direction from said null position for deriving an output voltage across said output winding indicative of the amount and direction of said angular displacement.

2. In combination, an electromagnetic device including a stationary member and a rotating member, said members each having a plurality of pole pieces, a continuous input winding wound about a first set of pairs of adjacent pole pieces of one of said members, said input winding comprising a plurality of serially-connected coils connected in series opposition, each coil surrounding a pair of said first set and each encircling successive pairs of said first set in opposite directions, said input winding being supplied with alternating current electrical energy for producing magnetic flux in the pole pieces of said one member, a continuous output winding wound about a second set of pairs of adjacent pole pieces of said one member which are displaced from said first set, said output winding comprising a plurality of serially-connected coils linked by said magnetic flux and each surrounding a pair of pole pieces of said second set, said rotating member having a null position in which the voltage induced in each coil of said output winding is substantially zero, and means responsive to the angular displacement of said rotating member in either direction from said null position for deriving an output voltage across said output winding indicative of the amount and direction of said angular displacement.

3. In combination, an input shaft whose instantaneous angular deviation from a predetermined position is to be measured, an electromagnetic device including a stationary member and a rotating member fixedly attached to said input shaft, said members each having a plurality of radially disposed pole pieces equally spaced about the periphery thereof, a continuous input winding wound about a first set of pairs of adjacent pole pieces of one of said members, said input winding comprising a plurality of coils connected in series opposition, each coil of said input winding surrounding a pair of pole pieces of said first set and each encircling successive pairs of said first set in opposite directions, means for energizing said input winding for producing magnetic flux in the pole pieces of said one member, a continuous output winding wound about a second set of pairs of adjacent pole pieces of said one member which are displaced from said first set by one pole pitch, said output winding comprising a plurality of serially-connected loops linked by said magnetic flux, said loops being connected in series opposition, and each surrounding a pair of said second set, said rotating member having a null position in which the center line of one of the pole pieces of the other of said members bisects the angle formed by the center lines of a pair of adjacent pole pieces of said one member, and means responsive to the angular displacement of said rotating member in either direction from said null position for deriving an output voltage across the terminals of said output winding indicative of the amount and direction of said angular displacement.

4. In combination, an electromagnetic device including a stationary member and a rotating member, said members each having a plurality of radially disposed pole pieces, a continuous input winding wound about a first set of pairs of said pole pieces of one of adjacent members, said input winding comprising a plurality of coils of like number of turns connected in series opposition, each coil of said input winding surrounding a corresponding pair of pole pieces of said first set and each encircling successive pairs of said first set in opposite directions, a source of alternating current input voltage applied to said input winding for producing magnetic flux in the pole pieces of said one member, a continuous output winding wound about a second set of pairs of adjacent pole pieces of said one member which are displaced from said first set, said output winding comprising a plurality of serially-connected loops linked by said magnetic flux and each surrounding a corresponding pair of pole pieces of said second set, said rotating member having a null position in which the center line of a given one of the pole pieces of the other of said members bisects the angle formed by the center lines of a pair of adjacent pole pieces of said one member, and means responsive to the angular displacement of said rotating member from said null position for deriving an output voltage across the terminals of said output winding whose magnitude and phase is dependent upon the amount and direction, respectively, of angular deviation of said rotor from said null position, the relation between said output voltage and said deviation being substantially linear within the desired limits of operation, and phase comparison means responsive to said input and output voltages for indicating the amount and direction of said angular deviation.

5. In combination, an electromagnetic device including a stationary member and a rotating member, said members each having a plurality of pole pieces, a continuous input winding wound about a first set of pairs of adjacent pole pieces of one of said members, said input winding being supplied with alternating current electrical energy for producing magnetic flux in the pole pieces of said one member which is in the same direction in both pole pieces of each pair of said first set but in opposite directions in the pole pieces of successive pairs, and a continuous output winding wound about a second set of pairs of said pole pieces of said one member which are displaced from said first set, said output winding being linked by said magnetic flux.

6. In combination, an electromagnetic device including a stationary member and a rotating member, said members each having a plurality of pole pieces, a continuous input winding wound about a first set of pairs of adjacent pole pieces of one of said members, said input winding being supplied with electrical energy for producing magnetic flux in the pole pieces of said one member which is in the same direction in both pole pieces of each pair of said first set but in opposite directions in the pole pieces of adjacent pairs, and a continuous output winding wound about a second set of pairs of adjacent pole pieces of said one member which are displaced from said first set, said output winding being linked by said magnetic flux, and being electrically separated from said input winding.

7. In combination, an electromagnetic device including a stationary member and a rotating member, said members each having a plurality of pole pieces of substantially identical size and configuration, a continuous input winding wound about a first set of pairs of adjacent pole pieces of one of said members, means for supplying an alternating current voltage to said input winding for producing magnetic flux in the pole pieces of said one member which is in the same direction in both pole pieces of each pair of said first set but in opposite directions in the pole pieces of each pair of said first set, and a continuous output winding wound about a second set of pairs of adjacent pole pieces of said one member which are displaced from said first set, said output winding being linked by said magnetic flux, the ends of the pole pieces of said one member being of enlarged cross section.

8. In combination, an electromagnetic device including a stationary member and a rotating member, said members each having a plurality of pole pieces, a continuous input winding wound about a first set of pairs of adjacent pole pieces of one of said members, said input winding being supplied with electrical energy for producing magnetic flux in the pole pieces of said one member which is in the same direction in both pole pieces of each pair of said first set but in opposite directions in the pole pieces of adjacent pairs of said first set, and a continuous output winding wound about a second set of pairs of adjacent pole pieces of said one member which are displaced from said first set, said output winding being linked by said magnetic flux, said rotating member having a null position in which the flux in one pole piece of any given pair of said second set balances that in the other pole piece of the same pair, means responsive to the angular displacement of said rotating member in either direction from said null position for deriving an output voltage across said output winding indicative of the amount and direction of said angular displacement.

References Cited in the file of this patent

UNITED STATES PATENTS

| | | |
|---|---|---|
| 2,173,039 | Muir | Sept. 12, 1939 |
| 2,274,443 | Fischer | Feb. 24, 1942 |
| 2,340,609 | Mestas | Feb. 1, 1944 |
| 2,361,790 | Noxon | Oct. 31, 1944 |
| 2,365,439 | Schulze | Dec. 19, 1944 |
| 2,379,417 | Conrad | July 3, 1945 |
| 2,484,022 | Esval | Oct. 11, 1949 |
| 2,498,317 | Tubbs et al. | Feb. 21, 1950 |

FOREIGN PATENTS

| | | |
|---|---|---|
| 993,372 | France | July 25, 1951 |

UNITED STATES PATENT OFFICE
CERTIFICATE OF CORRECTION

Patent No. 2,847,664                                               August 12, 1958

John W. Lewis

It is hereby certified that error appears in the printed specification of the above numbered patent requiring correction and that the said Letters Patent should read as corrected below.

Column 9, line 59, for "said" read -- adjacent --; same line, for "adjacent" read -- said --.

Signed and sealed this 17th day of February 1959.

(SEAL)
Attest:

KARL H. AXLINE                                        ROBERT C. WATSON
Attesting Officer                                     Commissioner of Patents